United States Patent
Sawahashi et al.

(10) Patent No.: US 8,111,766 B2
(45) Date of Patent: Feb. 7, 2012

(54) RADIO PARAMETER GROUP GENERATING APPARATUS, TRANSMITTER AND RECEIVER

(75) Inventors: Mamoru Sawahashi, Yokohama (JP);
Kenichi Higuchi, Saitama (JP);
Hiroyuki Atarashi, Yokohama (JP);
Motohiro Tanno, Yokohama (JP);
Yoshihisa Kishiyama, Yokosuka (JP);
Yoshiaki Ofuji, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/164,140

(22) Filed: Jun. 20, 2011

(65) Prior Publication Data

US 2011/0249764 A1 Oct. 13, 2011

Related U.S. Application Data

(62) Division of application No. 12/913,352, filed on Oct. 27, 2010, now Pat. No. 7,991,064, which is a division of application No. 11/913,060, filed as application No. PCT/JP2006/308466 on Apr. 21, 2006, now Pat. No. 7,848,447.

(30) Foreign Application Priority Data

Apr. 28, 2005 (JP) ................................. 2005-133322

(51) Int. Cl.
*H04L 27/28* (2006.01)
*H04K 1/10* (2006.01)
(52) U.S. Cl. ......... 375/260; 375/295; 370/203; 370/208
(58) Field of Classification Search .................. 375/295, 375/260; 370/203, 208
See application file for complete search history.

(56) References Cited

U.S. PATENT DOCUMENTS

| 6,381,229 | B1 | 4/2002 | Narvinger et al. |
| 7,130,293 | B2 | 10/2006 | Hanada et al. |
| 7,315,566 | B2 | 1/2008 | Tanno et al. |
| 7,397,839 | B2 | 7/2008 | Maeda et al. |
| 7,526,011 | B2 | 4/2009 | Maeda et al. |
| 2004/0114504 | A1 | 6/2004 | Jung et al. |

FOREIGN PATENT DOCUMENTS

| CN | 1588936 | | 3/2005 |
| EP | 1 164 733 | A1 | 12/2001 |
| JP | 9-307599 | | 11/1997 |
| JP | 9-512156 | | 12/1997 |
| JP | 10-327122 | | 12/1998 |

(Continued)

OTHER PUBLICATIONS

International Search Report (w/ Engl. Tran. for PCT/JP2006/308466 mailed Jul. 18, 2006 (5 pages).

(Continued)

*Primary Examiner* — Ted M Wang
(74) *Attorney, Agent, or Firm* — Osha• Liang LLP

(57) ABSTRACT

An apparatus for generating sets of radio parameters includes a first deriving unit deriving a set of radio parameters for specifying a symbol including an effective symbol part with the same period as the effective symbol part specified by another set of radio parameters and a guard interval part with a different period from the guard interval part specified by the other set of radio parameters. The apparatus further includes a second deriving unit deriving a set of radio parameters so that an occupancy proportion of the guard interval part in a single symbol specified by another set of radio parameters is equal to an occupancy proportion of the guard interval part in a single symbol specified by the other set of radio parameters.

1 Claim, 10 Drawing Sheets

FOREIGN PATENT DOCUMENTS

| | | |
|---|---|---|
| JP | 2001-111519 | 4/2001 |
| JP | 2001-238253 A | 8/2001 |
| JP | 2002-94402 | 3/2002 |
| JP | 2003-528527 | 9/2003 |
| JP | 2005-6337 | 1/2005 |
| JP | 2005-110014 | 4/2005 |
| TW | 400675 | 8/2000 |
| TW | 466882 | 12/2001 |
| WO | 02/41548 A1 | 5/2002 |
| WO | 2004/086711 A1 | 10/2004 |
| WO | 2006/134830 A1 | 12/2006 |

OTHER PUBLICATIONS

Tohru Ohtsu, Challenge to "Systems Beyond IMT-2000"—Approach in wireless-; ITU Journal vol. 33, No. 3, pp. 26-30. Mar. 2003 (11 pages).
Taiwanese Office Action for Taiwanese Application No. 095114889, mailed on Oct. 30, 2008 (15 pages).
Patent abstract for Chinese Publication No. 1588936, Publication date Mar. 2, 2005 (1 page).
Patent abstract for Taiwanese Publication No. 466882, Publication Date Dec. 1, 2001 (1 page).
Japanese Office Action for Application No. 2005-133322, mailed on Aug. 4, 2009 (7 pages).
Japanese Office Action for patent application No. 2005-133322, mailed Dec. 1, 2009, and English translation thereof, 5 pages.
Patent Abstracts of Japan for application with Publication No. 2002-094402, Publication Date: Mar. 29, 2002, 1 page.
Office Action for Japanese Patent Application No. 2010-019587 mailed Apr. 19, 2011, with English translation thereof (6 pages).
Patent Abstract for Japanese Publication No. 2001-238253 Published Aug. 31, 2001 (1 page).
Extended Search Report for European Application No. 06732224.8 mailed Apr. 21, 2011 (8 pages).

FIG.6
(A)
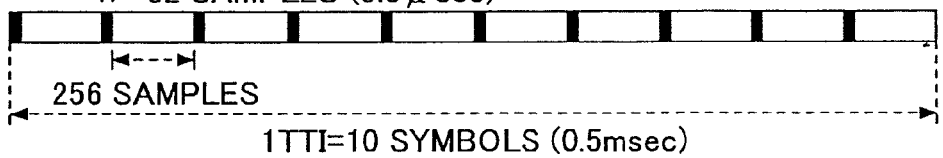
32 SAMPLES (5.6 μ sec)
256 SAMPLES
1TTI=10 SYMBOLS (0.5msec)
(B)
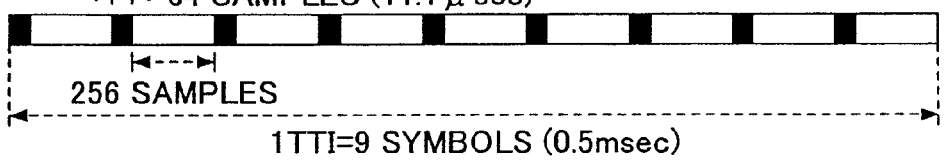
64 SAMPLES (11.1 μ sec)
256 SAMPLES
1TTI=9 SYMBOLS (0.5msec)
(C)
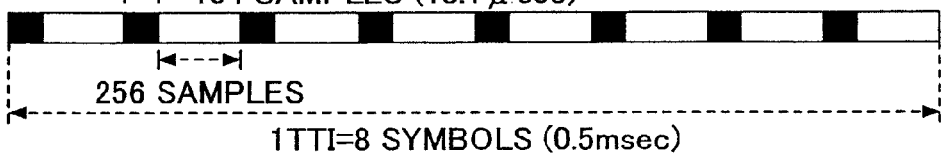
104 SAMPLES (18.1 μ sec)
256 SAMPLES
1TTI=8 SYMBOLS (0.5msec)
(D)
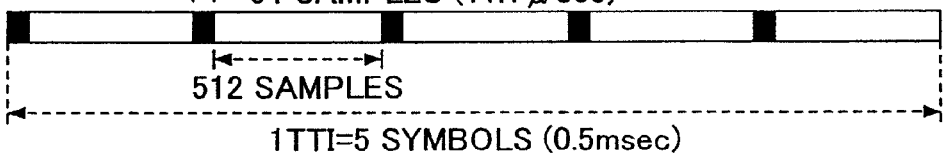
64 SAMPLES (11.1 μ sec)
512 SAMPLES
1TTI=5 SYMBOLS (0.5msec)
(E)
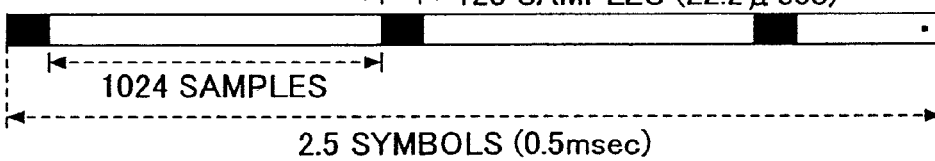
128 SAMPLES (22.2 μ sec)
1024 SAMPLES
2.5 SYMBOLS (0.5msec)
(F)
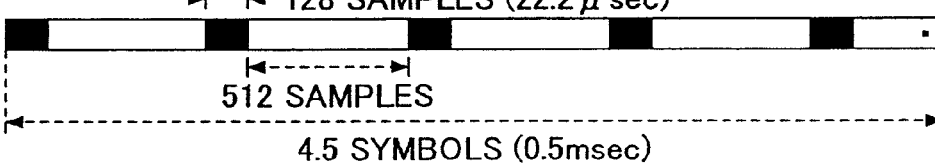
128 SAMPLES (22.2 μ sec)
512 SAMPLES
4.5 SYMBOLS (0.5msec)

RADIO PARAMETER GROUP GENERATING APPARATUS, TRANSMITTER AND RECEIVER

CROSS-REFERENCE TO RELATED APPLICATIONS

This application is a divisional application of U.S. patent application Ser. No. 12/913,352 filed on Oct. 27, 2010. U.S. patent application Ser. No. 12/913,352 is a divisional application of U.S. patent application Ser. No. 11/913,060 filed on Oct. 29, 2007. U.S. patent application Ser. No. 11/913,060 is a national stage application of PCT/JP2006/308466 filed Apr. 21, 2006, which claims priority to JP2005/133322 filed Apr. 28, 2005.

TECHNICAL FIELD

The present invention relates to an apparatus for generating a set of radio parameters, a transmitter and a receiver.

BACKGROUND ART

In the fourth generation mobile communication systems where video and/or data are mainly communicated, there is need of a far higher capability than in the third generation mobile communication systems (IMT-2000), and higher capacity, faster speed and broadbanding have to be achieved. In these systems, it is supposed that they are used under various communication environments such as inside and outside houses. Outside houses, plural cells (multi-cell) covering a wide area are provided for enabling fast packet transmission for a fast-moving mobile station. Inside houses, since radio waves are attenuated more drastically, access points are provided within buildings without support of radio communication at outdoor base stations. From other viewpoints such as improved utilization efficiency of communication resources, packet transmission type communication has been employed even in radio intervals rather than conventional circuit switching type communication. In communications between a mobile station and an upper apparatus other than a base station, particularly in downlink data transmission, not only a unicast scheme but also a multicast scheme and a broadcast scheme are employed. For example, see non-patent document 1 for an outlook of future communication systems.

On the other hand, frequency selective fading under multipath environments has significant influence in wideband mobile communication systems. Hence, the OFDM (Orthogonal Frequency Division Multiplexing) scheme is promising as the next generation communication scheme. In the OFDM scheme, a single symbol is generated by attaching a guard interval part to an effective symbol part including information to be transmitted, and plural symbols are transmitted during a predefined transmission time interval (TTI). The guard interval part consists of a portion of information within the effective symbol part. The guard interval part may be also called a cyclic prefix (CP) or overhead.

At the receiver side, paths are received with various propagation delays. According to the OFDM scheme, if the amount of propagation delay falls within the period of the guard interval part, inter-symbol interference can be effectively reduced. Thus, a relatively large guard interval period allows delay waves to be advantageously synthesized. This is advantageous particularly in communications with an extremely large cell radius and in simultaneous transmission of the same information from different cells to a mobile station in accordance with the multicast scheme. However, the guard interval part includes only a portion of the effective symbol part, and thus a larger period of the guard interval part is not preferred from the viewpoint of information transmission efficiency. In some cases, satisfactory communication quality may be maintained under environments with relatively short propagation delay such as urban areas and indoor areas or environments available for the unicast scheme by setting a relatively short guard interval part. Therefore, it is impossible to determine a single type of guard interval part optimized under various communication environments. For this reason, it may be conceived that many sets of radio parameters for specifying symbols including guard interval parts with various sizes are provided and radio communications are carried out in the adaptively determined optimal symbol format. However, signal processing corresponding to such various symbol formats leads to an extremely heavy workload, which is unfavorable for mobile stations with a relatively simple configuration. For a mobile station having no option of operating frequency (clock frequency), strictly limited signal processing is available, and thus the above problem may have a particularly adverse effect on such a mobile station.

Non-patent document 1: Ohtsu, "Systems beyond IMT-2000", ITU Journal, Vol. 33, No. 3, pp. 26-30, March 2000

DISCLOSURE OF INVENTION

Object to be Solved by the Invention

The present invention addresses at least one of the above-mentioned problems. One object of the present invention is to provide a transmitter and a receiver capable of dealing with both of the unicast scheme and multicast scheme flexibly for use in a mobile communication system in accordance with the OFDM scheme and an apparatus for generating a set of radio parameters for the transmitter and receiver.

Means for Solving the Object

In an embodiment of the present invention, an apparatus is used for generating sets of radio parameters for use in an OFDM scheme mobile communication system transmitting or receiving plural symbols in a predefined time frame, each of the symbols comprising a guard interval part and an effective symbol part. This apparatus includes a first deriving unit deriving a set of radio parameters for specifying a symbol, the symbol comprising the effective symbol part with the same period as the effective symbol part specified by another set of radio parameters and the guard interval part with a different period from the guard interval part specified by the other set of radio parameters; and a second deriving unit deriving a set of radio parameters so that an occupancy proportion of the guard interval part in a single symbol specified by another set of radio parameters is equal to an occupancy proportion of the guard interval part in a single symbol specified by the set of radio parameters.

Advantage of the Invention

According to the embodiment of the present invention, a transmitter and a receiver for use in OFDM scheme mobile communication systems can flexibly deal with the unicast scheme and the multicast scheme.

BRIEF DESCRIPTION OF DRAWINGS

FIG. 6 is a set of diagrams illustrating respective symbol formats specified in accordance with a set of derived radio parameters according to one embodiment of the present invention;

Figure 1:
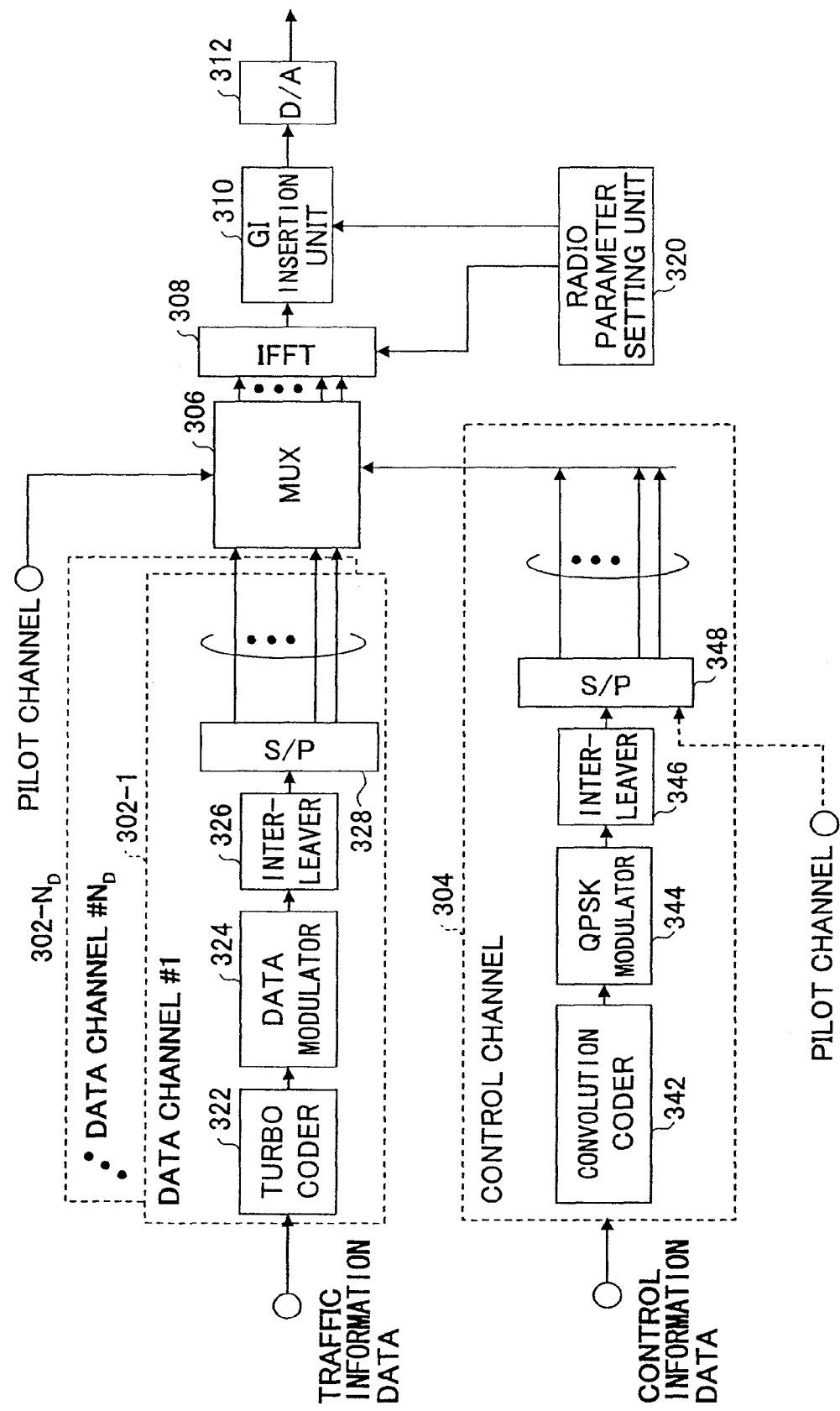
FIG. 1 is a (first) block diagram schematically illustrating a transmitter according to one embodiment of the present invention.

LIST OF REFERENCE SYMBOLS 302-1 to 302-$N_D$: data channel processing unit
304: control channel processing unit
306: multiplexing unit
308: inverse fast Fourier transform unit
310: guard interval insertion unit
312: digital to analog (D/A) conversion unit
320: radio parameter setting unit
322: turbo coder
324: data modulation unit
326: interleaver
328: serial to parallel (S/P) conversion unit
342: convolution coder
344: QPSK modulator
346: interleaver
348: serial to parallel (S/P) conversion unit
402: orthogonal modulator
404: local oscillator
406: bandpass filter
408: mixer
410: local oscillator
412: bandpass filter
414: power amplifier
502: antenna
504: low noise amplifier
506: mixer
508: local oscillator
510: bandpass filter
512: automatic gain control unit
514: orthogonal detector
516: local oscillator
518: analog to digital conversion unit
520: symbol timing detector
522: guard interval removal unit
524: fast Fourier conversion unit
526: demultiplexer
528: channel estimation unit
530: channel compensation unit
532: parallel to serial (P/S) conversion unit
534: channel compensation unit
536: interleaver
538: turbo coder
540: Viterbi decoder
542: radio parameter setting unit

BEST MODE FOR CARRYING OUT THE INVENTION

According to one implementation of the present invention, a set of radio parameters is for specifying a symbol including an effective symbol part with the same period as the effective symbol part specified by another set of radio parameters and a guard interval part with a different period from the guard interval part specified by the other set of radio parameters. In this set of radio parameters, the period of the effective symbol part, that is, a subcarrier interval is kept constant. So, even if any set of radio parameters is used, a radio communication apparatus can operate without changing signal processing schemes in the OFDM modulation and demodulation scheme (inverse fast Fourier transform and fast Fourier transform).

According to one implementation of the present invention, a set of radio parameters is derived so that an occupancy proportion (loss rate) of the guard interval part in a single symbol specified by another set of radio parameters is equal to an occupancy proportion of the guard interval part in a single symbol specified by the set of radio parameters. Since the loss rate is kept constant, constant data transmission efficiency can be achieved even under any set of radio parameters.

According to one implementation of the present invention, a set of radio parameters is derived such that the subcarrier interval and the loss rate are set have desired values. For example, the number of subcarriers specified by a certain set of radio parameters may be set to be a multiple integer of the number of subcarriers specified by another set of radio parameters. As a result, a set of radio parameters with a considerably different period of the guard interval part can be derived while controlling the subcarrier interval and the loss rate.

A transmitter and a receiver may select one of plural sets of radio parameters depending on whether the communication scheme complies with a multicast scheme.

The transmitter and the receiver may include a multiplexing unit multiplexing a common channel and a shared data channel in time direction, frequency direction or time and frequency directions, wherein the common channel is provided for transmitting uniform contents to plural users and the shared channel is used for data transmission for each of the plural users and is shared among the plural users. If the shared control channel and the shared channel are multiplexed in two directions of the time and frequency directions, a frequency directional channel arrangement in a certain time slot may be different from a frequency directional channel arrangement in another time slot. Consequently, fading tolerance can be effectively improved in the time and frequency directions.

First Embodiment

In the following embodiment, systems adopting OFDM (Orthogonal Frequency Division Multiplexing) in downlink are described, but the present invention is applicable to other multi-carrier scheme systems.

FIG. 1 is a block diagram schematically illustrating a transmitter according to one embodiment of the present invention. This transmitter is typically provided in a base station, but the same transmitter may be provided in a mobile station. A base station includes $N_D$ data channel processing units 302-1 to 302-$N_D$, a control channel processing unit 304, a multiplexing unit (MUX) 306, an inverse fast Fourier conversion (IFFT) unit 308, a guard interval insertion unit 310, a digital to analog (D/A) conversion unit 312 and a radio parameter setting unit 320. The $N_D$ data channel processing units 302-1 to 302-$N_D$ have the same configuration and function, and the data channel processing unit 302-1 is representatively described hereinafter. The data channel processing unit 302-1 includes a turbo coder 322, a data modulator 324, an interleaver 326 and a serial to parallel (S/P) conversion unit 328. The control channel processing unit 304 includes a convolution coder 342, a QPSK modulator 344, an interleaver 346 and a serial to parallel (S/P) conversion unit 348.

The $N_D$ data channel processing units 302-1 to 302-$N_D$ perform baseband operations for transmitting traffic information data in accordance with the OFDM scheme. The turbo coder 322 performs encoding for enhancing error tolerance of the traffic information data. The data modulator 324 modulates the traffic information data in accordance with a proper modulation scheme such as QPSK, 16QAM and 64QAM. In the case of adaptive modulation and coding (AMC), this modulation scheme is modified if needed. The interleaver 326 sorts the traffic information data in accordance with a predefined pattern. The serial to parallel (S/P) conversion unit 328 converts a serial signal sequence (stream) into parallel signal sequences. The number of parallel signal sequences may be determined depending on the number of subcarriers.

The control channel processing unit 304 performs baseband operations for transmitting control information data in accordance with the OFDM scheme. The convolution coder 342 performs encoding for enhancing error tolerance of the control information data. The QPSK modulator 344 modulates the control information data in accordance with the QPSK modulation scheme. Although some other proper modulation schemes may be adopted, in this embodiment, the QPSK modulation scheme with a lesser number of modulation levels is adopted due to its lesser amount of control information data. The interleaver 346 sorts the control information data in accordance with a predefined pattern. The serial to parallel (S/P) conversion unit 348 converts a serial signal sequence into parallel signal sequences. The number of parallel signal sequences may be determined depending on the number of subcarriers.

The multiplexing unit (MUX) 306 multiplexes processed (modulated, encoded, etc.) traffic information data and processed control information data. The multiplexing may be any scheme of time multiplexing, frequency multiplexing or time and frequency multiplexing.

The inverse fast Fourier transform unit 308 performs inverse fast Fourier transform on an incoming signal, and then performs OFDM scheme modulation.

The guard interval insertion unit 310 generates a symbol in compliance with the OFDM scheme by adding a guard interval to the modulated signal. As is well-known, the guard interval is obtained by duplicating a portion of the head or tail of the symbol to be transmitted.

The digital to analog (D/A) conversion unit 312 converts a baseband digital signal into an analog signal.

The radio parameter setting unit 320 sets radio parameters for use in communications. The radio parameters include some information for specifying the format of the OFDM scheme symbols, and include a set of information items for specifying values such as the period $T_{GI}$ of the guard interval unit, the period of the effective symbol part, the proportion of the guard interval part to a single symbol and the subcarrier interval $\Delta f$. The radio parameter setting unit 320 sets a proper set of radio parameters depending on communication conditions or instruction from other devices. For example, the radio parameter setting unit 320 may selectively use different sets of radio parameters depending on whether communications are carried out in accordance with the multicast scheme. For example, a set of radio parameters for specifying the guard interval unit with a shorter period may be employed in the unicast scheme, whereas a set of radio parameters for specifying the guard interval unit with a longer period may be employed in the multicast scheme. The radio parameter setting unit 320 may compute and derive a set of proper radio parameters in each case. Alternatively, the radio parameter setting unit 320 may store plural sets of radio parameters in a memory in advance and may select one set of radio parameters among them if needed. The manner of selecting the set of radio parameters will be described below.

Figure 2:
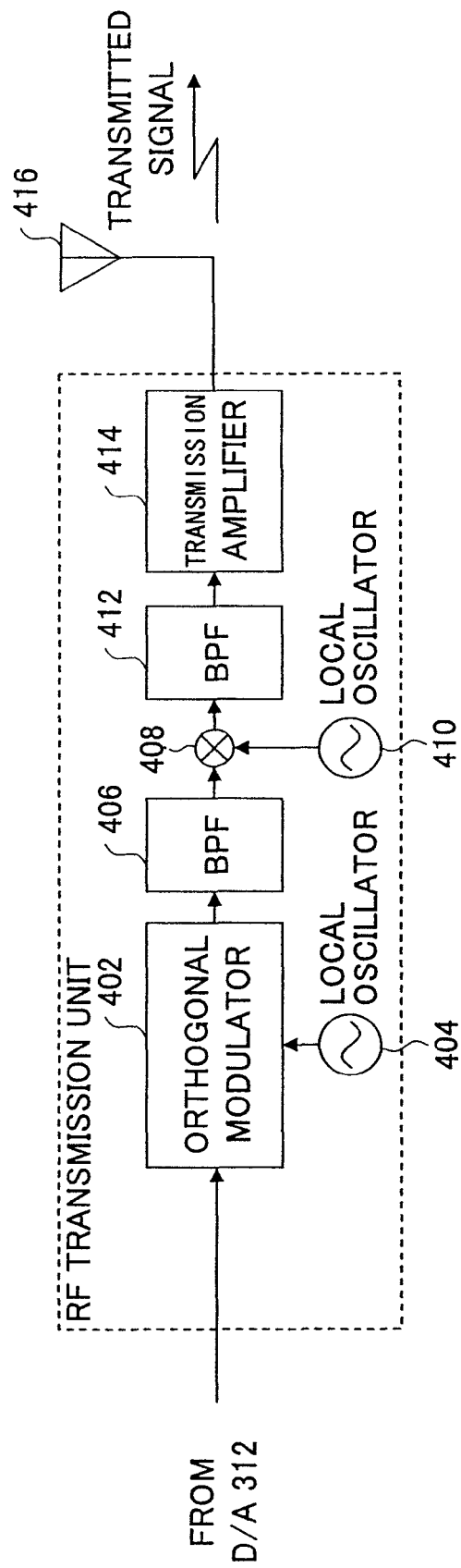
FIG. 2 is a (second) block diagram schematically illustrating a transmitter according to one embodiment of the present invention.

FIG. 2 is a second block diagram schematically illustrating a transmitter according to one embodiment of the present invention. In the illustration, the portion (RF transmission unit) subsequent to the digital to analog conversion unit 312 in FIG. 1 is illustrated. The RF transmission unit includes an orthogonal modulator 402, a local oscillator 404, a bandpass filter 406, a mixer 408, a local oscillator 410, a bandpass filter 412 and a power amplifier 414.

The orthogonal modulator 402 generates an in-phase component (I) and a quadrature component (Q) of an intermediate frequency from an incoming signal. The bandpass filter 406 removes a frequency component unnecessary for the intermediate frequency band. The mixer 408 uses the local oscillator 410 to convert (up-convert) the intermediate frequency signal into a high frequency signal. The bandpass filter 412 removes an unnecessary frequency component. The power amplifier 414 amplifies power of signals for radio transmission from the antenna 416.

Traffic information data incoming to the data channel processing unit in FIG. 1 is encoded in the turbo coder 322, is modulated in the data modulation unit 324, is sorted in the interleaver 326, and is made parallel in the serial to parallel converter 328. Similarly, control information data is encoded, modulated, interleaved and sorted. Data channels and control channels are multiplexed for each subcarrier in the multiplexing unit 306, and are OFDM scheme modulated in the inverse fast Fourier transform unit 308. Then, a guard interval is added to the modulated signal for outputting baseband OFDM symbols. The baseband signal is converted into an analog signal. Then, the converted signal is orthogonally modulated in the orthogonal modulator in the RF processing unit in FIG. 4. After band-limiting, the modulated signal is properly amplified and radio transmitted.

Figure 3:
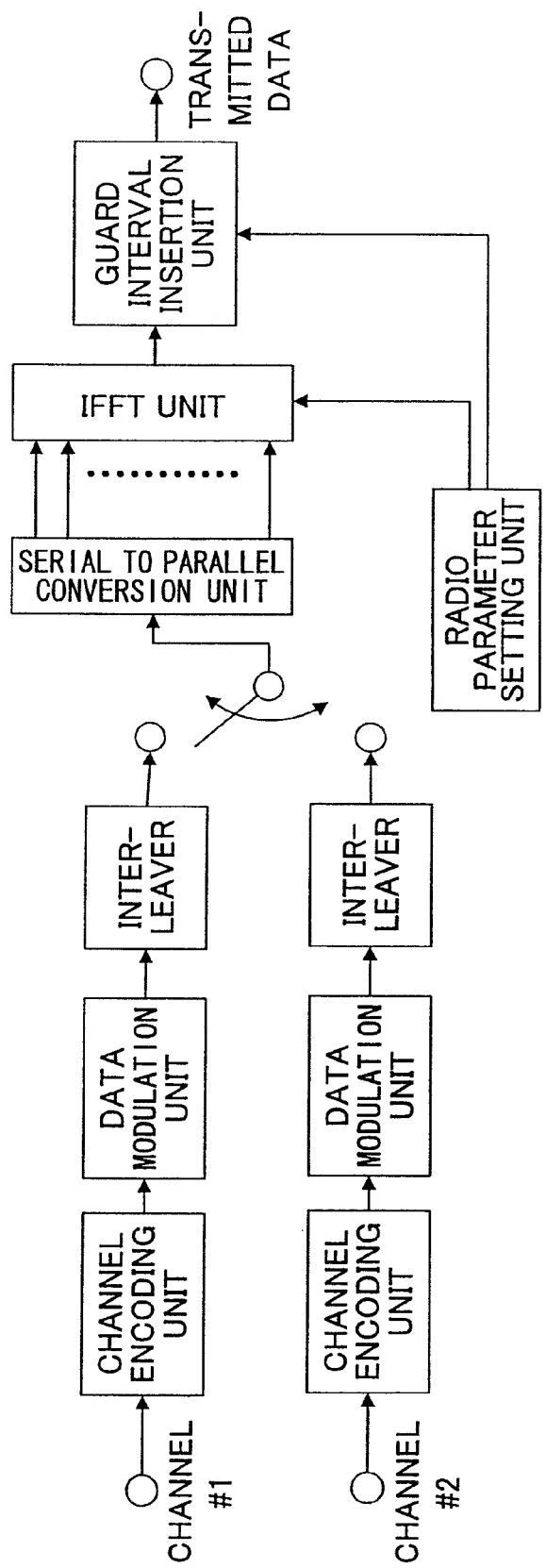
FIG. 3 is a diagram illustrating an exemplary case where time multiplexing is performed in a multiplexing unit.
Figure 4:
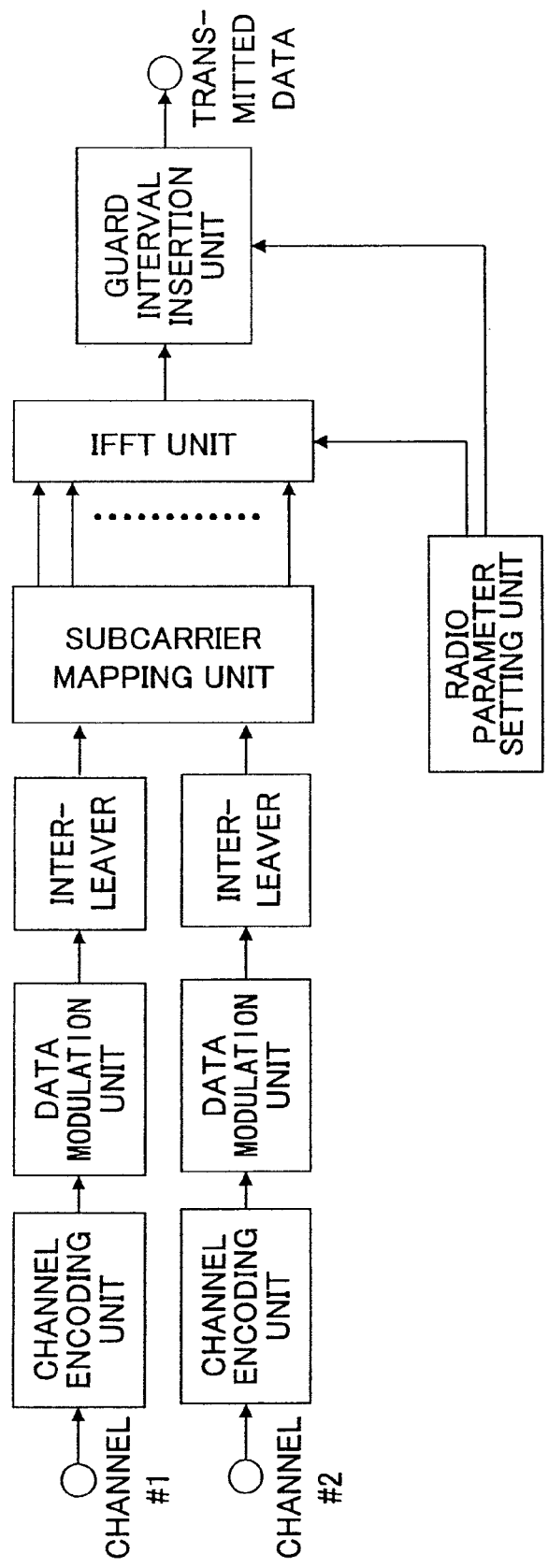
FIG. 4 is a diagram, illustrating an exemplary case where frequency multiplexing is performed in the multiplexing unit.

The multiplexing unit 306 multiplexes and supplies control channels and data channels properly. In this embodiment, pilot channels are also supplied and multiplexed in the multiplexing unit 306. In other embodiments, pilot channels are supplied to the serial to parallel conversion unit 348 for multiplexing in the frequency direction as illustrated by a dotted line. This multiplexing may be any scheme of time direction, frequency direction or both time and frequency directions. FIG. 3 illustrates exemplary time multiplexing of two signals. In this illustration, channel #1 and channel #2 represent one or more data channels and control channels. Although only the two signals are multiplexed in the illustration for simplification, three signals may be time-multiplexed. FIG. 4 illustrates exemplary frequency multiplexing of two signals. Through some multiplexing in the multiplexing unit 306, radio resources (time slots and/or frequencies) suitable for control channels and data channels are assigned.

Figure 5:
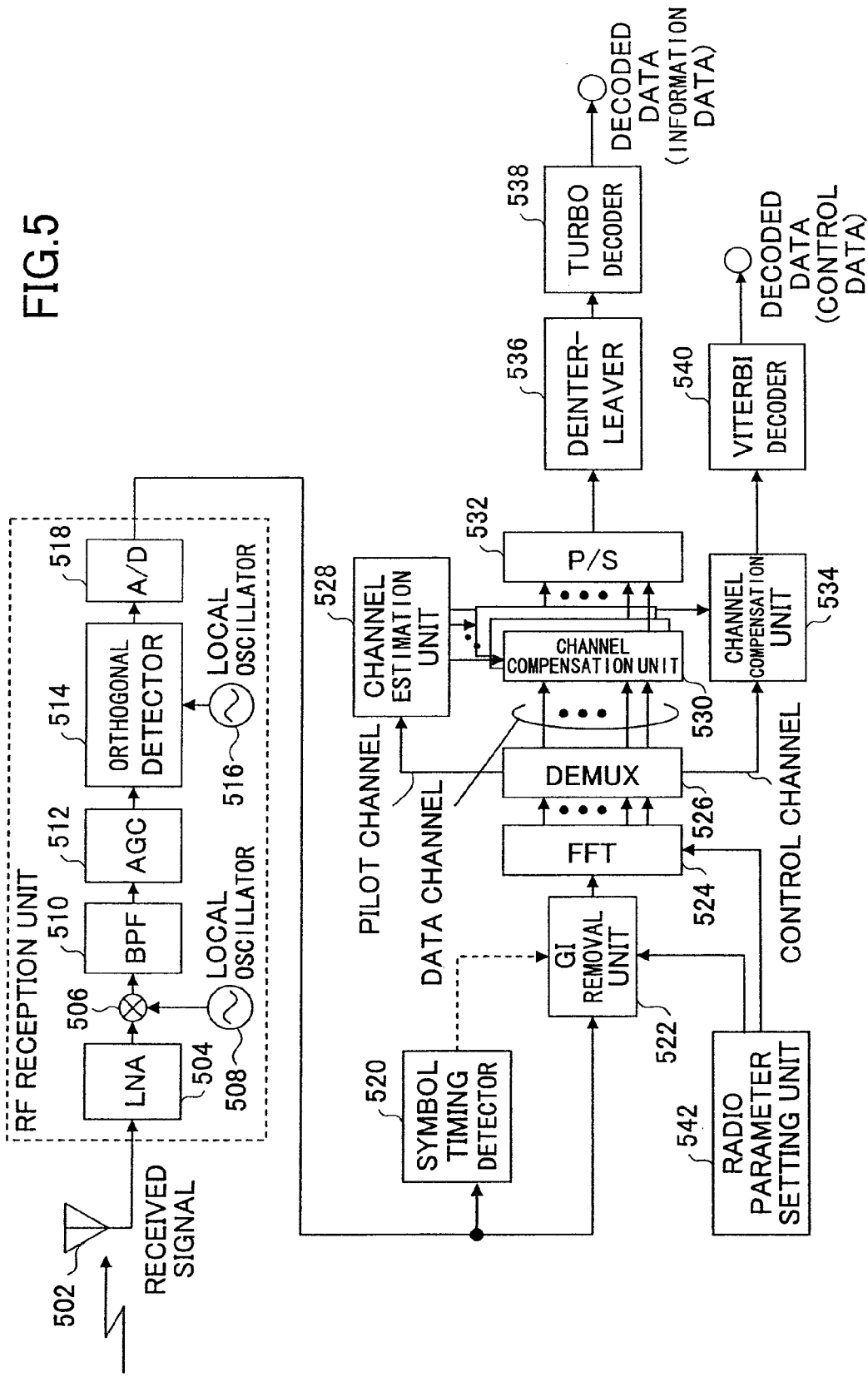
FIG. 5 is a block diagram schematically illustrating a receiver according to one embodiment of the present invention.

FIG. 5 is a block diagram schematically illustrating a receiver according to one embodiment of the present invention. Such a receiver may be typically provided in a mobile station, but it may also be provided in a base station. The receiver includes an antenna 502, a low noise amplifier 504, a mixer 506, a local oscillator 508, a bandpass filter 510, an automatic gain control unit 512, an orthogonal detector 514, a local oscillator 516, an analog to digital conversion unit 518, a symbol timing detection unit 520, a guard interval removal unit 522, a fast Fourier transform unit 524, a demultiplexer 526, a channel estimation unit 528, a channel compensation unit 530, a parallel to serial (P/S) conversion unit 532, a channel compensation unit 534, a deinterleaver 536, a turbo coder 538, a Viterbi decoder 540 and a radio parameter setting unit 542.

The low noise amplifier 504 amplifies a signal received via the antenna 502 properly. The amplified signal is converted (down-converted) into an intermediate frequency in the mixer 506 and the local oscillator 508. The bandpass filter 510 removes an unnecessary frequency component. The automatic gain control unit 512 controls the gain of the amplifier so as to maintain the signal level properly. The orthogonal detector 514 uses the local oscillator 516 for orthogonal demodulation based on an in-phase component (I) and a quadrature component (Q) of the received signal. The analog to digital conversion unit 518 converts an analog signal into a digital signal.

The symbol timing detection unit 520 detects timing of symbols (symbol boundary) based on the digital signal.

The guard interval removal unit 522 removes a portion corresponding to the guard interval from the received signal.

The fast Fourier transform unit 524 performs fast Fourier transform on an incoming signal for OFDM scheme demodulation.

The demultiplexer 526 extracts pilot channels, control channels and data channels multiplexed in a received signal. This extraction method is performed corresponding to multiplexing at the transmitting side (operation in the multiplexing unit 306 in FIG. 1).

The channel estimation unit 528 uses the pilot channels to estimate conditions of the channels, and supplies a control signal for adjusting the amplitude and phase so that the channel variation can be compensated for. This control signal is supplied for each subcarrier.

The channel compensation unit 530 adjusts the amplitude and phase of the data channels in accordance with information supplied from the channel estimation unit 528.

The parallel to serial (P/S) conversion unit 532 converts parallel signal sequences into a serial signal sequence.

The channel compensation unit 534 adjusts the amplitude and phase of the control channels in accordance with information supplied from the channel estimation unit 528.

The deinterleaver 536 changes the order of signals in accordance with a predefined pattern. The predefined pattern corresponds to the inverse pattern for sorting in the interleaver (326 in FIG. 1) in the transmitting side.

The turbo coder 538 and the Viterbi decoder 540 decode traffic information data and control information data, respectively.

The radio parameter setting unit 542 sets radio parameters for use in communications as in the radio parameter setting unit 320 in FIG. 1. The radio parameter setting unit 542 may compute and derive a set of proper radio parameters in each case. Alternatively, the radio parameter setting unit 542 may store plural sets of radio parameters in a memory in advance and access them if needed. The manner of deriving the radio parameters will be described below.

A signal received via an antenna is finally converted into a digital signal after experiencing some operations such as amplification, frequency conversion, band-limiting and demodulation. The fast Fourier transform unit 524 performs an OFDM scheme demodulation on a guard interval removed signal. The demodulated signal is separated into pilot channels, control channels and data channels in the separation unit 526. The pilot channels are supplied to the channel estimation unit, and a compensation signal for compensating for variation of channels is supplied from the channel estimation unit for each subcarrier. The data channels are compensated for by means of the compensation signal for each subcarrier and are converted into a serial signal. The converted signal is sorted by the deinterleaver 526 in accordance with the inverse pattern for sorting in the interleaver and is decoded in the turbo decoder 538. Similarly, the control channels are also compensated for by means of the compensation signal and are decoded in the Viterbi decode 540. After that, signal processing is carried out with use of the decoded data and control channels.

Next, the set of radio parameters and deriving method thereof in the radio parameter setting units 320 and 542 are described below. A set of radio parameters specifies subcarrier interval, sampling frequency, period of the effective symbol part, period of the guard interval part, the number of symbols in a single frame (or a single TTI), period of a single TTI and others. Note that all the parameters cannot be set independently. For example, the subcarrier interval and the period of the effective symbol part have reciprocal relationships with each other. Also, if one frame corresponds to one TTI, period of the TTI is derived by multiplying the period of one symbol (total period of the guard interval part and the effective symbol part) with the number of symbols. Three methods of deriving a second set of radio parameters from a first set of radio parameters are described below.

First, as illustrated in FIG. 6A, suppose that the first set of radio parameters is set as follows.
subcarrier interval=22.5 kMHz
the total number of subcarriers=200
sampling frequency=5.76 MHz=3/2×3.84 MHz
period of effective symbol part=256 samples (44.4 μs)
period of guard interval part=32 samples (5.5 μs)
period of one symbol=288 samples (guard interval part+ effective symbol part)
loss rate=32/288=11.1%
the number of symbols in one frame (or TTI)=10
period of one TTI=0.5 ms The loss rate means the proportion of the guard interval part in one symbol. This portion becomes a redundant portion from the viewpoint of improved data transmission efficiency. The loss rate η, the period $T_{GI}$ of the guard interval part and the period $T_{eff}$ of the effective symbol part have the relationship as follows;

$$\eta = T_{GI}/(T_{GI}+T_{eff}) \times 100 [\%].$$

(1) A first method of deriving a set of radio parameters decreases the number of symbols in a single frame and increases the period of the guard interval part while keeping the subcarrier interval constant. For example, if a first set of radio parameters now includes ten symbols in a single frame, the number of symbols is reduced to nine. Then, the period corresponding to the reduced one symbol (288 samples) is equally divided into nine portions, which are separately assigned to the guard interval part. As a result, as illustrated in FIG. 6B, while the period of the effective symbol part (256 samples) is kept equal, the single frame includes 9 symbols with longer periods of the guard interval part. A second set of radio parameters derived in this manner has the parameter values as follows.
subcarrier interval=22.5 kMHz
the total number of subcarriers=200
sampling frequency=5.76 MHz=3/2×3.84 MHz
period of effective symbol part=256 samples (44.4 μs)

period of guard interval part=64 samples (11.1 µs)
period of one symbol=320 samples
loss rate=64/320=20%
the number of symbols in one frame (or TTI)=9
period of one TTI=0.5 ms According to the first method, if the number of symbols in one frame is reduced to eight frames, the second set of radio parameters has the parameter values as follow (FIG. 6C).
subcarrier interval=22.5 kMHz
the total number of subcarriers=200
sampling frequency=5.76 MHz=3/2×3.84 MHz
period of effective symbol part=256 samples (44.4 µs)
period of guard interval part=104 samples (18.1 µs)
period of one symbol=360 samples
loss rate=104/360=28.9%
the number of symbols in one frame (or TTI)=8
period of one TTI=0.5 ms Subsequently through similar operations, it is possible to derive sets of radio parameters with different numbers of symbols in a single frame. In this case, the period of the effective symbol part is always kept constant, and thus the constant subcarrier interval can be maintained. In other words, while the same subcarrier interval is specified in accordance with any of the sets of radio parameters derived in this manner, the period of the guard interval part and the number of symbols differ from each other.

(2) A second method of deriving a set of radio parameters changes the number of symbols in a frame while maintaining a constant loss rate. As understood from the definition of the loss rate, the proportion of the guard interval part and the effective symbol part have to be kept constant so as to fulfill the constant loss rate. For example, for the first set of radio parameters, as illustrated in FIG. 6D, the respective periods of the guard interval part and the effective symbol part are doubled, and accordingly the number of symbols in one frame can be reduced to 5 symbols. In this case, the second set of radio parameters has the parameter values as follows.
subcarrier interval=11.25 (=22.5/2) kMHz
the total number of subcarriers=400 (=200×2)
sampling frequency=5.76 MHz=3/2×3.84 MHz
period of effective symbol part=512 (=256×2) samples (88.8 µs)
period of guard interval part=64 (=32×2) samples (11.1 µs)
period of one symbol=576 samples
loss rate=64/576=11.1%
the number of symbols in one frame (or TTI)=5
period of one TTI=0.5 ms In addition, for the first set of radio parameters, as illustrated in FIG. 6E, the respective periods of the guard interval part and the effective symbol part are quadrupled, and accordingly the number of symbols in one frame can be reduced to 2.5 symbols. In this case, the second set of radio parameters has the parameter values as follows. In this case, it is desirable that the period of a single frame be extended from 0.5 ms to 1.0 ms, for example, so that the number of symbols in the frame can be some integer.
subcarrier interval=5.625 (=22.5/4) kMHz
the total number of subcarriers=800 (=200×4)
sampling frequency=5.76 MHz=3/2×3.84 MHz
period of effective symbol part=1024 (=256×4) samples (177.8 µs)
period of guard interval part=128 (=32×4) samples (22.2 µs)
period of one symbol=1152 samples
loss rate=128/1152=11.1%
the number of symbols in one frame (or TTI)=2.5
period of one TTI=0.5 ms According to this method, the constant loss rate can be maintained, and thus, it is possible to derive sets of radio parameters with equal data transmission efficiency. In the first method, as less symbols are included in a frame, the loss rate becomes higher.

(3) A third method of deriving sets of radio parameters is configured as a combination of the first method and the second method. For example, the first method may be applied to the first set of radio parameters to derive the second set of radio parameters, and in turn the second method may be applied to the second set of radio parameters to derive the third set of radio parameters. Suppose that the application of the first method to the first set of radio parameters has resulted in the second set of radio parameters for specifying a symbol format as illustrated in FIG. 6B. Then, the loss rate is 64/320=20% for the second set radio parameters. For the second set of radio parameters, the number of symbols is modified while maintaining the constant loss rate. For example, if the respective periods of the guard interval part and the effective symbol part are duplicated, the third set of radio parameters has the parameter values as follows (FIG. 6F).
subcarrier interval=11.25 kMHz
the total number of subcarriers=400
sampling frequency=5.76 MHz=3/2×3.84 MHz
period of effective symbol part=512 samples (88.8 µs)
period of guard interval part=128 samples (22.2 µs)
period of one symbol=640 samples
loss rate=128/640=20%
the number of symbols in one frame (or TTI)=4.5
period of one TTI=0.5 ms Also in this case, it is desirable that the period of a single frame be extended to 1.0 ms, for example, so that the frame can include an integer number of symbols. The third set of radio parameters derived in this manner includes the same loss rate (20%) as the set of radio parameters shown in FIG. 6B, and includes the same subcarrier interval (11.25 kHz) as the set of radio parameters shown in FIG. 6D. However, it is noted that the period of the guard interval part (128 samples) for the third set of radio parameters is longer than any ones (64 samples) shown in FIGS. 6B and 6D. According to the third method, it is possible to efficiently derive a set of radio parameters with a predefined relationship between the subcarrier interval and the loss rate.

Figure 7:
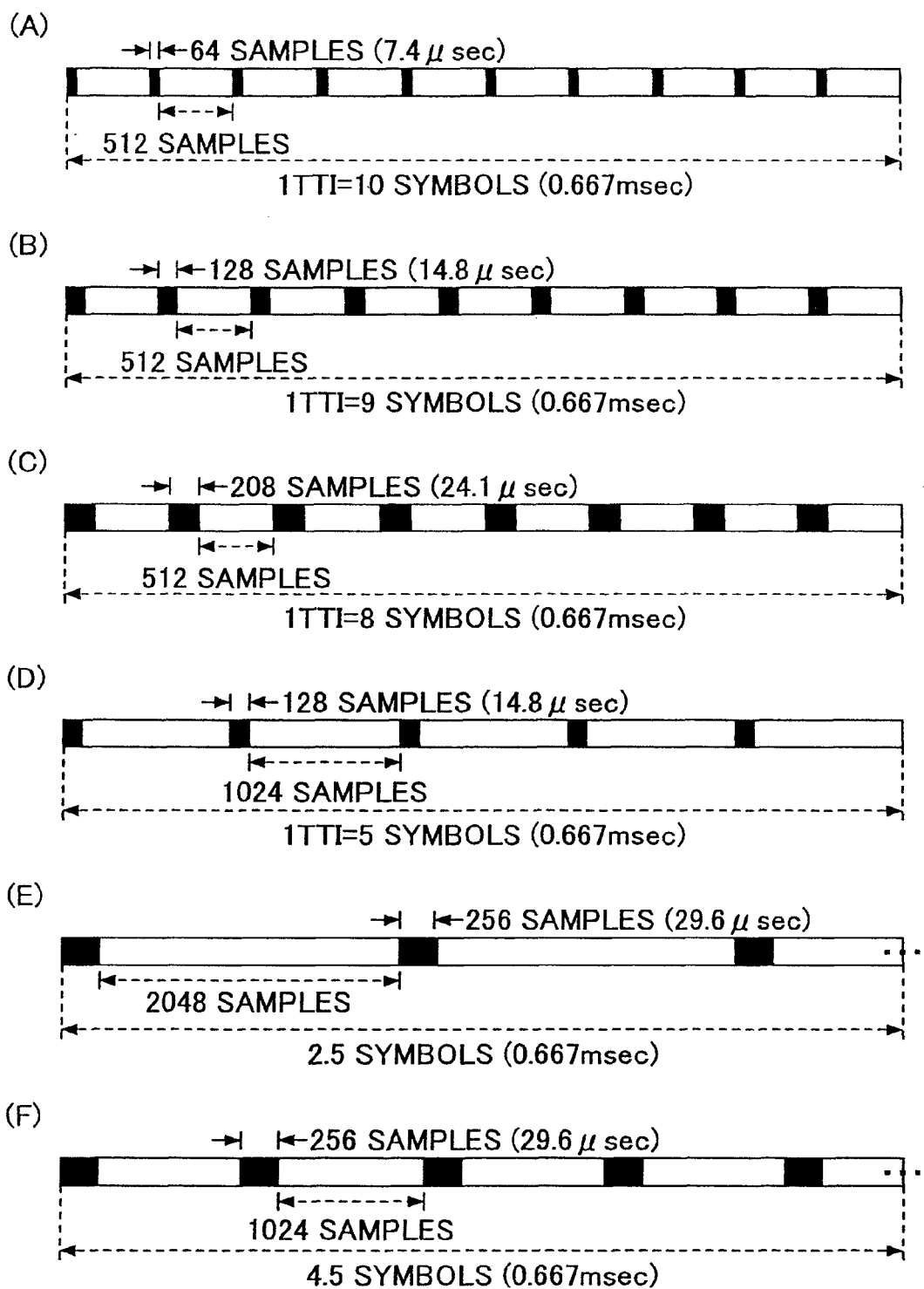
FIG. 7 is another set of diagrams illustrating respective symbol formats specified in accordance with a set of derived radio parameters according to one embodiment of the present invention.

FIG. 7 illustrates an exemplary case where other parameters values as presented below are set as the first set of radio parameters as in FIG. 6.
subcarrier interval=16.875 kMHz
the total number of subcarriers=266
sampling frequency=8.64 MHz=9/4×3.84 MHz
period of effective symbol part=512 samples (59.259 µs)
period of guard interval part=64 samples (7.407 µs)
period of one symbol=576 samples
loss rate=64/512=11.1%
the number of symbols in one frame (or TTI)=10
period of one TTI=0.667 ms If the first method is applied to another first set of radio parameters as presented above and the number of symbols is reduced to nine symbols while maintaining the period of the effective symbol part, another second set of radio parameters as presented below is derived (FIG. 7B).
subcarrier interval=16.875 kMHz
the total number of subcarriers=266
sampling frequency=8.64 MHz=9/4×3.84 MHz
period of effective symbol part=512 samples (59.259 µs)
period of guard interval part=128 samples (14.8 µs)
period of one symbol=640 samples loss rate=128/640=20%
the number of symbols in one frame (or TTI)=9
period of one TTI=0.667 ms In addition, if the number of symbols is reduced to eight symbols, further another second set of radio parameters is derived (FIG. 7C).
subcarrier interval=16.875 kMHz
the total number of subcarriers=266
sampling frequency=8.64 MHz=9/4×3.84 MHz
period of effective symbol part=512 samples (59.259 μs)
period of guard interval part=208 samples (24.1 μs)
period of one symbol=720 samples
loss rate=208/720=28.9%
the number of symbols in one frame (or TTI)=8
period of one TTI=0.667 ms Then, if the second method is applied to the first set of radio parameters and the period of the guard interval part is doubled while maintaining the loss rate, further another second set of radio parameters as presented below is derived (FIG. 7D).
subcarrier interval=8.438 kMHz
the total number of subcarriers=532
sampling frequency=8.64 MHz=9/4×3.84 MHz period of effective symbol part=1024 samples (118.519 μs)
period of guard interval part=128 samples (14.815 μs)
period of one symbol=1152 samples
loss rate=128/1152=11.1%
the number of symbols in one frame (or TTI)=5
period of one TTI=0.667 ms If the second method is applied to the first set of radio parameters and the period of the guard interval part is quadrupled while maintaining the loss rate, further another second set of radio parameters as presented below is derived (FIG. 7E).
subcarrier interval=8.438 kMHz
the total number of subcarriers=1064
sampling frequency=8.64 MHz=9/4×3.84 MHz
period of effective symbol part=2048 samples (237.037 μs)
period of guard interval part=256 samples (29.630 μs)
period of one symbol=2304 samples
loss rate=256/2304=11.1%
the number of symbols in one frame (or TTI)=2.5
period of one TTI=0.667 ms Finally, if the first method is applied to the first set of radio parameters and the second method is additionally applied to the resulting set, for example, the third set of radio parameters as presented below is derived (FIG. 7F).
subcarrier interval=8.438 kMHz
the total number of subcarriers=532
sampling frequency=8.64 MHz=9/4×3.84 MHz
period of effective symbol part=1024 samples (118.519 μs)
period of guard interval part=256 samples (29.630 μs)
period of one symbol=1280 samples
loss rate=256/1280=20%
the number of symbols in one frame (or TTI)=4.5
period of one TTI=0.667 ms The sets of radio parameters derived in this manner have the same property as those derived in case of TTI=0.5 ms. In other words, it is possible to easily provide plural sets of radio parameters having the same property for various TTIs. In addition, since all the sets of radio parameters are prepared for the same sampling frequency, it is not necessary to change clock frequency for each of the sets of radio parameters.

Figure 8:
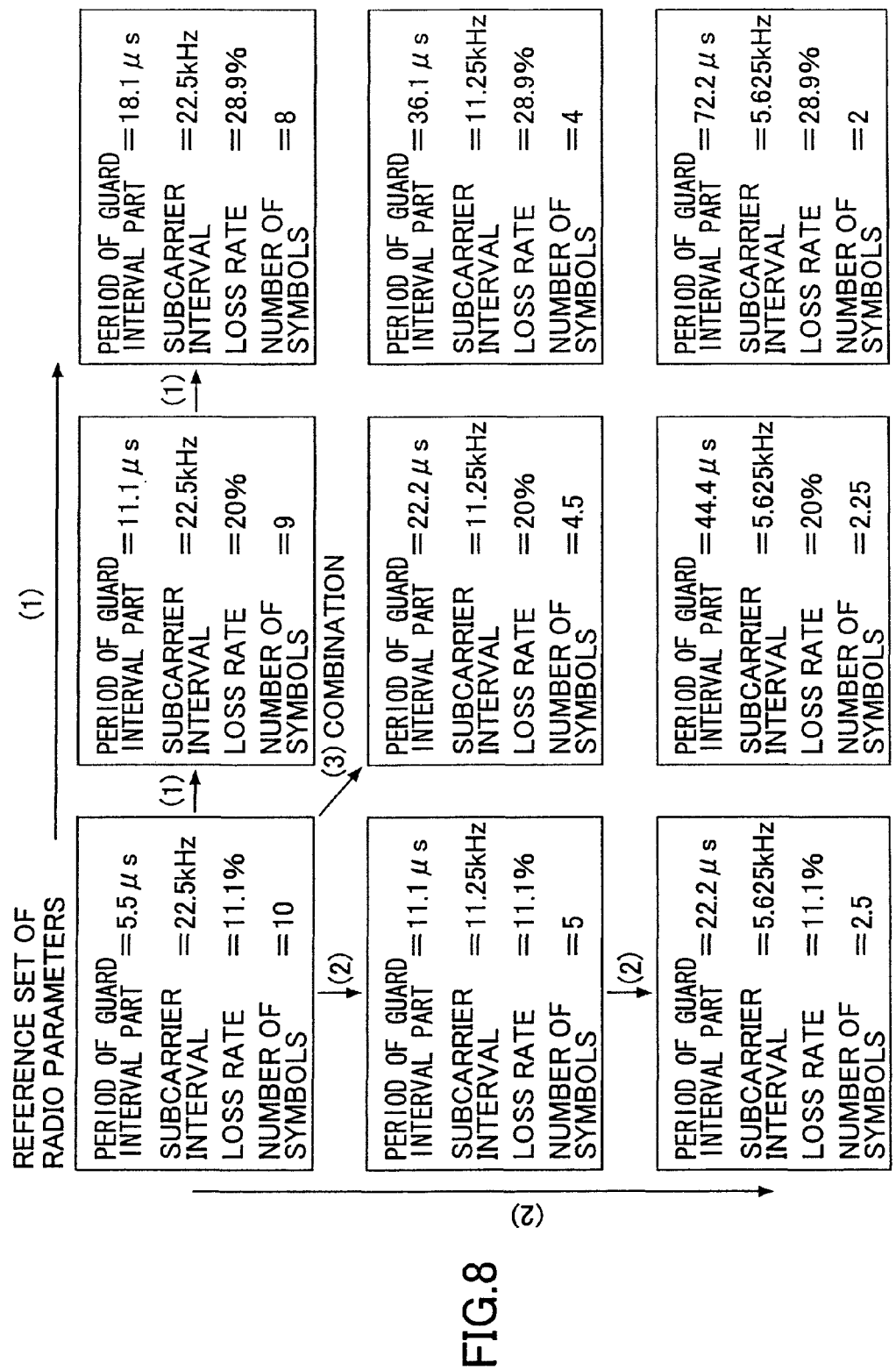
FIG. 8 is a diagram illustrating various sets of derived radio parameters according to one embodiment of the present invention.

FIG. 8 shows several exemplary sets of radio parameters in case of TTI=0.5 ms. Among nine sets of radio parameters, eight sets of radio parameters can be derived by applying the first method and/or the second method to the first set of radio parameters. According to this embodiment, it is possible to derive sets of radio parameters with predefined relationships between the subcarrier interval and the loss rate systematically and efficiently. In this embodiment, new sets of radio parameters have been derived in such a manner that the subcarrier interval and the number of symbols can be reduced from those of the reference set of radio parameters. In other embodiments, however, such new sets of radio parameters may be derived in such a manner that the subcarrier interval and the number of symbols can be increased from those of the reference set of radio parameters.

Second Embodiment

Figure 9:
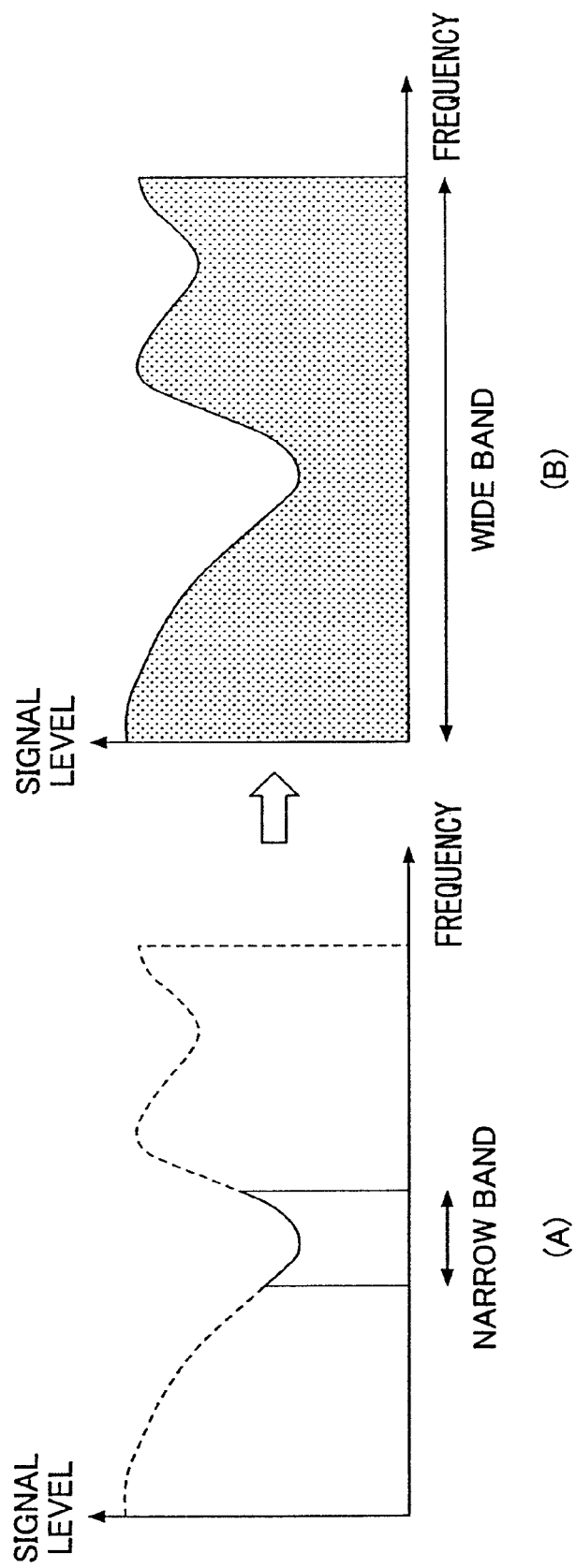
FIG. 9 is diagram illustrating exemplary frequency selective fading.

As stated above, the wider frequency band for use in radio transmission may lead to stronger frequency selective fading originating from multipath fading. FIG. 9 schematically shows exemplary reception levels of a signal subject to frequency selective fading. If the frequency band for use in radio transmission is a relatively narrow band as illustrated in FIG. 9A, the reception level within the band can be considered to be constant. On the other hand, if the frequency band is a wide band, there is significant dependence of the reception level on frequency. Thus, it is advantageous for higher speed and capacity to divide an overall radio band into multiple frequency blocks and apply the adaptive modulation and demodulation coding, the ARQ and the packet scheduling for each of the frequency blocks. Although a single frequency block generally includes one or more carrier frequencies, each frequency block is configured to have multiple subcarriers in this embodiment. Such a frequency block may be also referred to as a chunk. The frequency block or chunk may be used as the assignment unit of radio resources.

Figure 10:
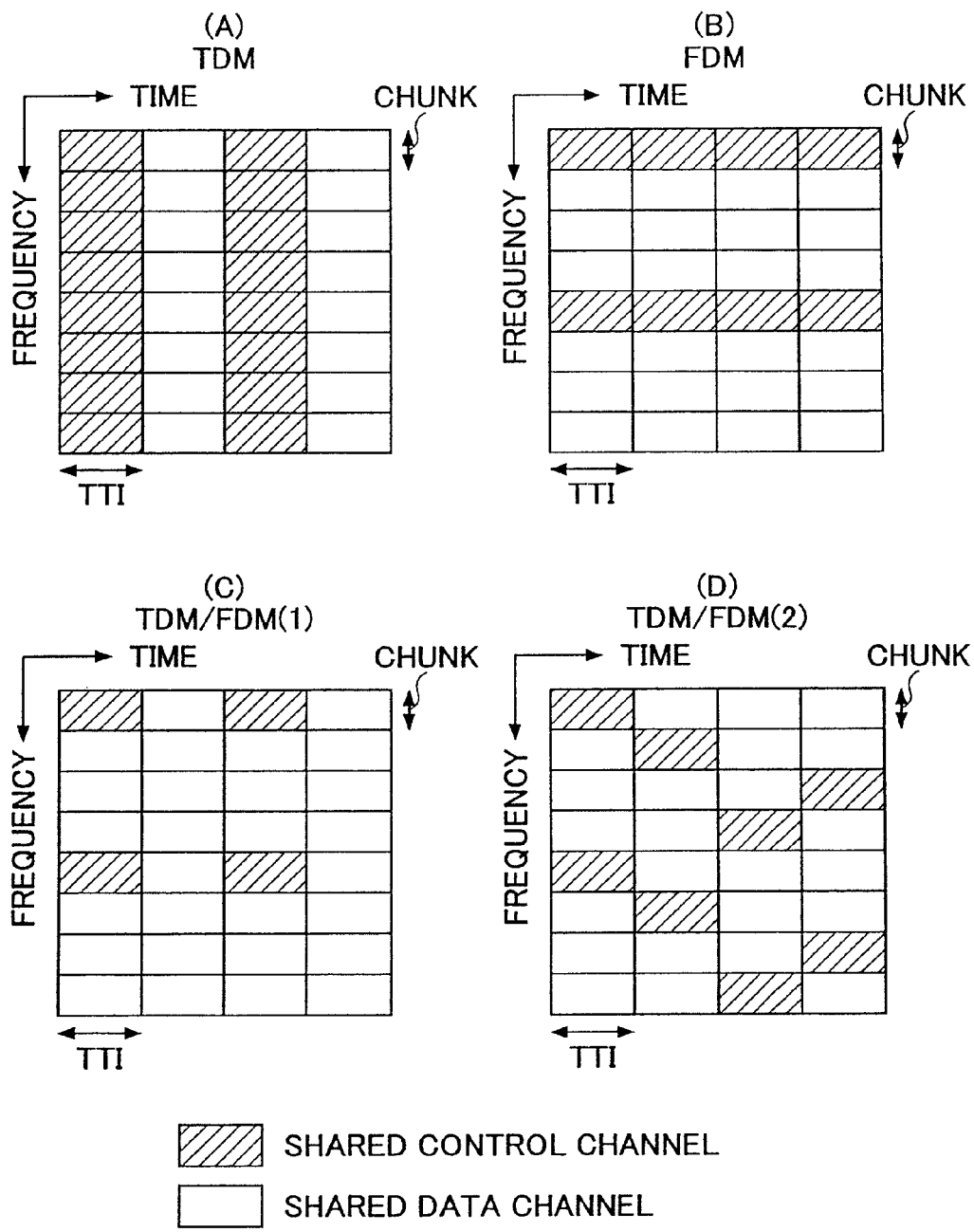
FIG. 10 is a diagram illustrating exemplary multiplexing on shared control channels and shared data channels.

FIG. 10 illustrates exemplary multiplexing on common channels and shared channels. The common channels are used for communications with unspecified mobile stations with the use of common resources. The shared channels are also used for scheduling for certain mobile stations and are shared among plural mobile stations.

Exemplary common channels in the downlink may include a shared control channel, a multicast channel pilot channel and a synchronization channel. The shared control channel is used to transmit broadcast information (system information) or paging information for waiting time. The multicast channel is used to transmit the same information data transmitted from multiple cell sites (base stations) and combine them in the receiving side. In this case, some diversity associated with frequency and time is carried out. In addition, frequency and time hopping may be carried out. The pilot channel is used to transmit reference signals known in the transmitting and receiving sides. The pilot channel may be provided or transmitted with the use of a directional beam with high or low directivity. Alternatively, it may be provided or transmitted with the use of an omnidirectional beam. The synchronization channel is used for cell search.

The shared channels in the downlink may include shared control channels and shared data channels. In communications via the shared control channels, transmission power may be adaptively controlled by using a channel quality indicator CQI. The shared data channel is used to transmit control messages for traffic data or layer 3. Scheduling is conducted depending on channel variations in frequency and time areas. In addition to the scheduling, some operations such as the adaptive modulation coding AMC and the hybrid ARQ may be conducted.

The common channels in the uplink may include a fast access channel, a reservation channel and a synchronization channel. These channels are provided or transmitted from each user without scheduling, resulting in the possibility of conflicts among the users. The fast access channel is used to transmit traffic data with severe delay tolerance, relatively small traffic data, control information and others. The reservation channel is used to transmit control information for reserving to use a shared data channel as described below. The synchronization channel is used to control transmission timing so that reception timing of the shared data channel and the shared control channel from multiple users falls within a guard interval.

The shared channels in the uplink may include a shared data channel and a shared control channel. The shared data channel is a channel usable after reservation is made with the use of the reservation channel and is used to transmit traffic data and layer 3 control messages. Scheduling may be carried out depending on channel variations in frequency and time areas. In addition to the scheduling, some operations such as the adaptive modulation coding AMC and the hybrid ARQ may be carried out. The shared control channel is used to transmit physical control messages and layer 2 control messages (FFS). In communications via the shared control channels, transmission power may be adaptively controlled with the use of a channel quality indicator CQI.

As illustrated in FIG. 10, the shared control channel and the shared data channel can be assigned and provided in various forms with respect to two directions of time slots (time direction) and frequency blocks (frequency direction). In the illustration, exemplary multiplexing on only the two types of channels, that is, the shared control channel and the shared data channel, is illustrated for simplicity, but more that two types of channels may be multiplexed.

FIG. 10A illustrates exemplary time division multiplexing. FIG. 10B illustrates exemplary frequency division multiplexing. FIG. 10C illustrates exemplary two-dimensional multiplexing associated with time and frequency. FIG. 10D illustrates another exemplary two-dimensional multiplexing associated with time and frequency. It is desirable that channels be multiplexed by distributing them widely in the frequency direction from the viewpoint of enhanced tolerance over frequency directional fading involved in band widening. In addition, as illustrated in FIGS. 10C and 10D, particularly in FIG. 10D, multiplexing in both the time and frequency directions can enhance the frequency directional fading tolerance as well as improve the time directional fading tolerance involved in fast movement. In FIG. 10C, an arrangement pattern of the frequency directional channel multiplexing for a certain time slot is the same as that for another time slot. In FIG. 10D, an arrangement pattern of the frequency directional channel multiplexing for a certain time slot is different from those for other time slots (such a channel arrangement may be also referred to as a staggered scheme), and thus further enhanced fading tolerance can be expected.

Although the preferred embodiments of the present invention have been described above, the present invention is not limited to them, and various modifications and variations can be made within the scope and sprit of the present invention. For simplicity, the present invention has been described with the use of some discrete embodiments. However, such separation of the embodiments is not essential to the present invention, and one or more embodiments may be used if needed.

This international patent application is based on Japanese Priority Application No. 2005-133322 filed on Apr. 28, 2005, the entire contents of which are hereby incorporated by reference.

The invention claimed is:

1. An apparatus for generating sets of radio parameters for use in an OFDM (Orthogonal Frequency Division Multiplexing) scheme mobile communication system transmitting or receiving plural symbols in a predefined time frame wherein each of the symbols comprises a guard interval part and an effective symbol part, comprising:
a first deriving unit deriving a set of radio parameters for specifying a symbol, the symbol comprising the effective symbol part with the same period as the effective symbol part specified by another set of radio parameters and the guard interval part with a different period from the guard interval part specified by the other set of radio parameters; and
a second deriving unit deriving a set of radio parameters so that an occupancy proportion of the guard interval part in a single symbol specified by another set of radio parameters is equal to an occupancy proportion of the guard interval part in a single symbol specified by the set of radio parameters.

* * * * *